United States Patent Office 2,920,039
Patented Jan. 5, 1960

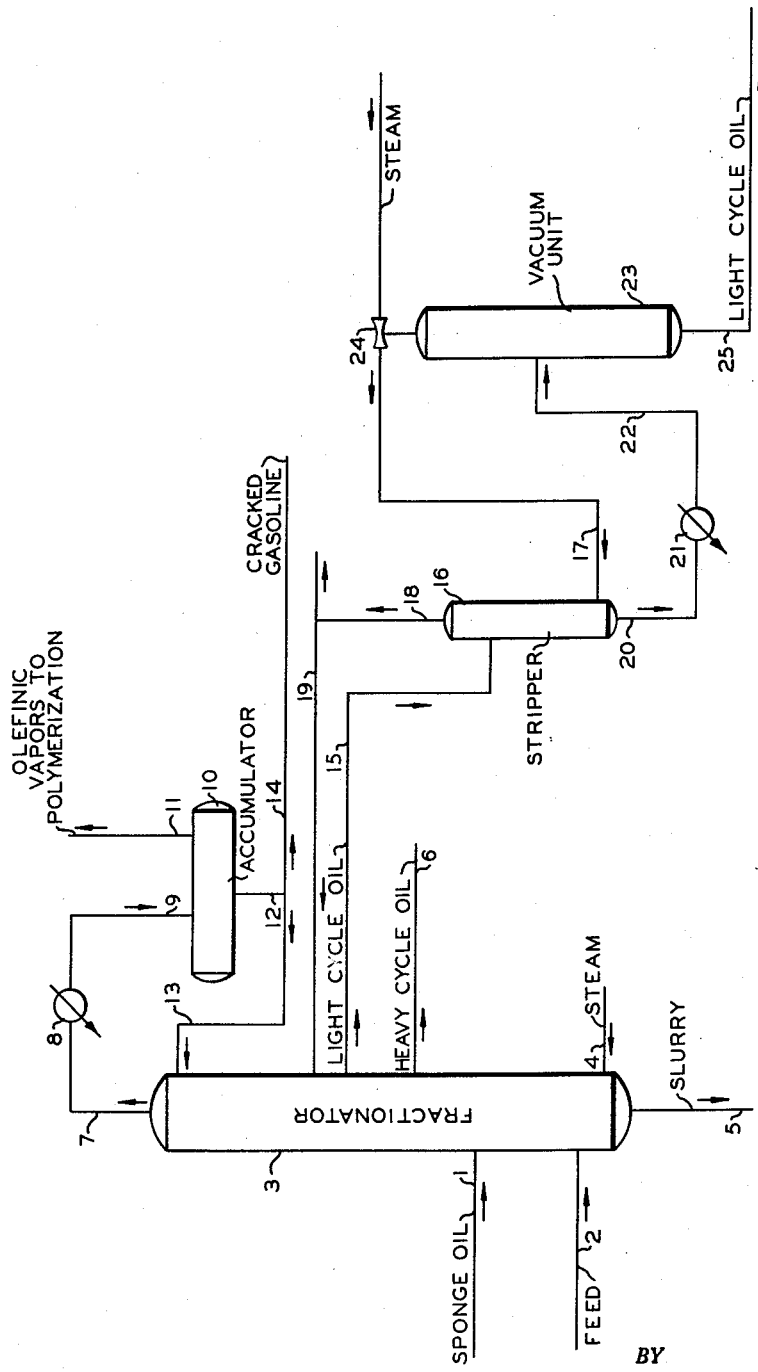

2,920,039

VACUUM TREATMENT OF LIQUIDS

Norman G. Miller, Kansas City, Kans., assignor to Phillips Petroleum Company, a corporation of Delaware Application October 6, 1955, Serial No. 538,980

10 Claims. (Cl. 208—361)

This invention relates to vacuum treatment of liquids. In one of its aspects, the invention relates to a vacuum flashing of a liquid to remove materials such as water, inert gases, solvents, or other solute vapors therefrom, the said liquid being the sole material fed to a vacuum flashing zone or drum, the pressure in which is maintained at a reduced value employing steam or other vapor as an actuating medium for a pressure-reducing means or zone, the said steam or vapor and unavoidably entrained liquid being passed to a point in the system preceding said flashing zone or drum, thus avoiding loss of desirable liquid. In another of its aspects, the invention relates to the vacuum drying of a steam stripped distillate by passing the same to a dehydration zone maintained under a reduced pressure employing a steam ejector means from which steam and unavoidably entrained distillate are recovered and returned to the said steam stripping.

A number of methods have been used in removing free or dissolved solutes from liquids, and particularly water from hydrocarbon liquids. The usual case involves solutes present in trace amounts ranging from a few parts per million up to about one weight percent which remain as residual contamination from preceding processes or as trace solutes introduced by preceding processes, e.g., moisture introduced into hydrocarbons by steam stripping.

There are extant certain methods for removing contaminants from liquids. In one of these methods, the contaminated liquid is cooled to reduce the solubility of the solute and to reject it as a solute-rich second phase. Such an operation in many instances involves uneconomically feasible heat exchange or refrigeration. Also, the second operation is required to separate the dispersed solute phase from the bulk liquid. This second operation will usually involve a coalescing step and its concomitant equipment or a filtration step, a centrifuging step or a long time high investment cost additional tankage settling step. Another method for removing contaminants from liquid is passing such liquid through adsorbent materials. Ordinarily at least two adsorbent filled vessels are required and their operation necessitates use of auxiliary heaters, pumps and piping for regenerating the contents of one vessel while the other is in service. Investment requirements here also are relatively high. Labor costs are also high. A further method is one in which vacuum flashing is employed at rather high temperatures and at relatively low absolute pressures, even as low as 2 to 8 mm. of mercury. These low pressures are obtained employing 4 and sometimes 5 inter-condensing ejector stages operated by steam. The investment cost for these ejectors is rather high and the barometric or surface condenser effluents obtained impose problems in cooling water contamination, waste disposal and oil recovery. The addition of steam to the ejectors is a continuous operating expense. This steam cannot be directly utilized in other processes.

It is an object of this invention to provide a vacuum treating process for removal of contaminants from liquids. It is another object of this invention to provide a process for the removal of contaminants from liquids at a reduced pressure in which process unavoidably entrained liquid from the reduced pressure treating step is recovered. Other aspects, objects and several advantages of the invention are apparent from this disclosure, the drawings, and the claims.

It has now been conceived, as a basis of the modus operandi herein disclosed and claimed, that with the combination of steps involved there can be made a selection of flashing pressures, which are ordinarily higher absolute pressures than those conventionally employed, with elimination of inter-condensing vacuum equipment so that the following desirable advantages can be obtained. Optimum flashing temperatures can be selected to achieve the desired degree of separation with minimum loss of the bulk liquid. Cost of vacuum equipment is reduced to a small fraction of that required for conventional vacuum flashing. Cooling water contamination, waste disposal and other problems ordinarily encountered with inter-condensing vacuum equipment are eliminated. Furthermore, as an important feature of the invention, bulk liquid loss recovery problems are completely eliminated. The actuating medium or motive fluid, usually steam, used in vacuum ejectors which are employed according to the invention, can be exhausted from the vacuum equipment and directly utilized as process steam in adjoining processes or steps. Virtually in every instance of application of the invention, the steam ejectors operate with no steam expense whatsoever since the exhaust steam is used to full advantage in an adjoining process or step such as in a fractionator, steam stripper or in a heater.

Thus, according to this invention, there is provided in the treatment of a liquid, the steps in combination which comprise maintaining a zone under a reduced pressure employing a reduced pressure creating zone in which the motive force is supplied by a motive fluid, usually steam, which can be recovered and used in an adjoining process or step, feeding to said zone of reduced pressure a liquid from which contaminants are to be flashed, removing from said zone of reduced pressure as a product of the process a contaminant-free liquid, and recovering and reusing motive fluid from said reduced pressure-creating zone together with unavoidably entrained liquid. In a specific embodiment of the invention, the liquid is the sole feed to the reduced pressure or flashing zone, the motive fluid is steam and steam and the unavoidably entrained liquid are recovered and passed to a step in the system which precedes the reduced pressure flashing zone.

The said preceding step can be one in which a material has been steam-stripped. Such a material which is steam-stripped can be an organic liquid which is steam-stripped to purify the same but which during the steam-stripping will pick up a small percentage of contaminating water. Or, the material being steam-stripped can be a liquid undergoing fractionation, for example, a hydrocarbon oil or distillate. More specifically, hydrocarbon distillate fraction can be treated according to the invention to yield distillates with very low cloud points and this is accomplished with minimum investment, minimum oil loss, negligible utilities expense, no cooling water contamination, no waste disposal problems, no oil recovery problems, minimum operating and maintenance labor.

It will be noted that the process provides a simple method of removing water, inert gases, solvents or other solutes existing either free or dissolved in the hydrocarbon or in the case a solvent is being treated dissolved in said solvent.

In a specific embodiment of the invention, a temperature-controlled stream is passed into a vacuum flash drum which can vary in design and in which there can be provided internal baffles or packing to obtain turbulence and/or a large surface area, as desired.

The pressure which is employed will usually be higher than those which are employed for drying lube oils and are selected to provide a minimum carry-over of the lower-boiling distillates (or other solvents) but at the same time are selected with the intent to minimize investment costs which can be accomplished according to the invention because a certain amount or proportion of carry-over can be tolerated in view of the fact that the recovery step involved is simple and, in fact, recovers all of the carry-over which will occur.

Referring particularly to several of the refinery fractions which are ordinarily treated to produce specification cloud points, the process of the invention will remove both free and dissolved water to yield cloud points as low as 0–20° F. This compares very favorably with the usual after-cooling step which is followed by inefficient settling, coalescing or filtering which removes only part of the free water and results in relatively high cloud points. As noted, these conventional processes including that of the adsorption type require a rather high investment.

Referring now to the drawing in which there is shown a specific form of apparatus according to the invention, a sponge oil and an effluent from a fluid catalytic cracking reactor are passed by way of conduits 1 and 2 into fractionator 3. Steam is introduced into fractionator 3 by way of conduit 4. It is known that the effluent from a fluid catalytic cracking reactor will contain some catalyst. This catalyst is recovered from the bottom of fractionator 3 as a slurry which is removed by way of conduit 5. The slurry is passed to a thickener apparatus (not shown) in which the catalyst is recovered for reuse upon separation of the major proportion of oil from it according to known manner. There are removed, in this embodiment, from fractionator 3, a heavy cycle oil by way of conduit 6 and an overhead by way of conduit 7, cooler 8, conduit 9, which conducts the condensate produced in cooler 8 and accompanying vapors to accumulator 10. Olefinic vapors and non-condensible gases which are found in accumulator 10 are taken overhead by way of conduit 11 for disposal as is well known in the art. Bottoms from the accumulator which will comprise catalytically cracked gasoline are removed therefrom by way of conduit 12 and in part passed by conduit 13 into the top of fractionator 3 as reflux therefor. Production quantities of gasoline are removed from the system by way of conduit 14. There is also removed from fractionator 3, by way of conduit 15, a light cycle oil (450–650° F.) which is passed to stripper 16 in which it is stripped with steam introduced by way of conduit 17 into the bottom of the stripper. The stripper is operated at about 8 pounds per square inch gauge. Overhead from stripper 16 can be removed by way of conduit 18 for disposal as desired and can be, as desired, passed in whole or in part by way of conduit 19 to fractionator 3. Bottoms from stripper 16 are removed at a temperature of approximately 460° F. by way of conduit 20, cooler 21, and by way of conduit 22 are passed to vacuum unit 23. The vacuum unit is maintained under reduced pressure by steam ejection means 24. Light cycle oil is removed as product from the bottom of vacuum unit 23 by way of conduit 25. The vacuum unit is operated at approximately 125 mm. mercury absolute pressure. The pressure of the steam leaving the steam ejector means 24 will be about 10 pounds per square inch gauge and will be at a temperature sufficient to maintain the stripping action in stripper 16, previously described. The bottoms from steam stripper 16, in this embodiment, contain about 300–700 parts per million of water. Bottoms removed by way of conduit 25 from the vacuum unit will contain about 40 parts per million or less of water. Since the steam from the ejector or ejectors will contain some light oils unavoidably entrained, it will be noted that the said oils will be recovered in the stripping section of the process in the above-described drawing, stripper 16, since the steam from the ejectors is used in the stripper. Whenever unavoidably entrained products are not joined with the material leaving the bottom of stripper 16 and are, therefore, of a character as to pass overhead by way of conduit 18, these are returned by way of conduit 19 to the fractionator and ultimately recovered for use elsewhere in the refinery. It will be noted that the light cycle oil product recovered by way of conduit 25 from vacuum unit 23 is not only a substantially dehydrated material but is, of course, light and free.

The oil leaving vacuum unit 23 will have a moisture cloud point of approximately —10° F.–0° F.

In the embodiment described, oil flash-over will amount to approximately 1/10th percent of the charge. However, there will be no oil loss, nor cooling water problem because the ejectors will exhaust their steam into the light cycle oil stripper 16. Since the steam exhaust is at about 10 pounds per square inch gauge and the light cycle oil stripper operates at about 8 pounds per square inch gauge, there is no problem here.

The described system is suitable for drying heavy oil distillates for which an optimum temperature and pressure would be approximately 125 mm. mercury absolute pressure at about 280° F. in the vacuum unit 23. Also, the described equipment would be suitable for vacuum flashing of light hydrocarbons from polymer streams, drying distillate yields at crude topping units or drying distillate transfers to loading tanks.

It will be clear to one skilled in the art in possession of this disclosure that a physical handling method has been described. The feed to this method can be varied at will. The invention is in the combination of steps which are employed and not in any particular feed stock. Therefore, the invention is not to be restricted to any particular feed stock. It will also be clear to one skilled in the art in possession of this disclosure that if the treating vapor in stripper 16 should be other than steam, that the said vapor might well be employed as the motive fluid for the ejector means 24. For example, a chemical reaction might well be carried out in stripper 16. The modus operandi or physical handling of the said chemical reaction could then be effected by feeding one of the reactants directly to vessel 16 and feeding the other reactant to vessel 16 by way of ejector means 24, in the form of a vapor, thus to actuate ejector means 24. In such a process, vacuum unit 23 would serve to remove the water of reaction, for example. Thus, the vessel 16 would be operated at a temperature at which most but not all of the water would be taken off or most of the water would be decanted at a point between vessel 16 and vessel 23. Vessel 23 would remove the final traces of water.

Reasonable variation and modification are possible within the scope of the foregoing disclosure, drawing and the appended claims to the invention, the essence of which is that the treatment of a liquid is accomplished by steps in combination which comprise feeding said liquid to a treating zone, in said zone treating said liquid with a vapor, usually steam, passing said steam-treated liquid to a dehydration zone maintained at a reduced pressure as the sole material introduced thereinto, maintaining the reduced pressure of said zone employing a reduced pressure-creating zone, actuating said reduced pressure-creating zone employing said vapor or steam as an actuating medium therefor, recovering said vapor and any unavoidably entrained liquid from said zone of reduced pressure, passing said recovered steam or vapor and unavoidably entrained liquid to said liquid-treating zone, all as substantially set forth and described herein.

I claim:

1. In the removal from a liquid in a zone under a sub-atmospheric pressure of minor quantities of another liquid which can be separated therefrom at a temperature and at a pressure prevailing in said zone of reduced pressure the steps in combination which comprise feeding to a separation zone an admixture of said liquids, in said separation zone separating a substantial proportion of said liquid which can be separated from said admixture, then passing the remaining liquid admixture to said zone maintained under sub-atmospheric pressure as the sole material fed to said zone for removal of substantially all of the remainder of said separatable liquid, maintaining said sub-atmospheric pressure in said zone of sub-atmospheric pressure employing in a sub-atmospheric pressure producing zone as actuating medium therefor a vapor of said separatable liquid, recovering said actuating medium and any unavoidably entrained remaining liquid which has been entrained from said sub-atmospheric zone by way of sub-atmospheric pressure reducing zone, passing said recovered actuating medium and unavoidably entrained liquid to said separation zone, thereby avoiding loss of said liquid from which said separatable liquid has been removed.

2. In the removal of small proportions of water from an oil in a zone of reduced pressure the steps in combination which comprise feeding an oil-water mixture to a separation zone, in said separation zone removing some of said water from said oil, then passing said oil containing a substantially reduced proportion of water therein to said zone of reduced pressure as the sole feed thereto, maintaining the reduced pressure of said zone employing a reduced pressure-creating zone, actuating said reduced pressure-creating zone employing steam as an actuating medium therefor, recovering said steam and any oil unavoidably entrained from said zone of reduced pressure, passing said recovered steam and unavoidably entrained oil to said separation zone, thereby avoiding loss of said oil, and recovering said oil of reduced water content from said zone of reduced pressure.

3. In the treatment of a non-water miscible liquid which comprises steam-treating said liquid and then dehydrating the same, the steps in combination which comprise feeding said liquid and steam to a steam-treating zone; in said zone contacting said liquid with said steam; removing said steam-treated liquid from said zone; passing said steam-treated liquid to a dehydration zone maintained under a reduced pressure employing a reduced pressure creating zone; employing steam as actuating medium for said reduced pressure-creating zone; recovering said steam together with unavoidably entrained liquid from said zone of reduced pressure; passing said recovered steam and unavoidably entrained liquid to said steam-treating zone, thereby avoiding loss of said liquid; and removing dehydrated liquid from said dehydration zone as a product of the process.

4. A process according to claim 3 wherein said liquid is a hydrocarbon oil.

5. In the dehydration of an oil the steps in combination which comprise feeding an oil containing a small proportion of water to a dehydration zone as the sole material introduced thereinto, maintaining said zone under a reduced pressure, maintaining the reduced pressure of said zone employing a reduced pressure-creating zone, actuating said reduced pressure-creating zone employing steam as an actuating medium therefor, recovering said steam and any oil unavoidably entrained from said zone of reduced pressure, passing said recovered steam and unavoidably entrained oil to a zone in which there is present additional quantities of said oil undergoing treatment, thus avoiding loss of said oil, and recovering dehydrated oil from said dehydration zone as a product of the process.

6. In the treatment of a substantially non-water miscible liquid the steps in combination which comprise feeding said liquid to a steam-stripping zone, in said zone stripping said liquid with steam, passing said steam-stripped liquid as the sole material fed to a dehydration zone maintained at a reduced pressure, maintaining the reduced pressure of said zone employing a reduced pressure-creating zone, actuating said reduced pressure-creating zone employing steam as an actuating medium therefor, recovering said steam and any unavoidably entrained liquid from said zone of reduced pressure, passing said recovered steam and unavoidably entrained liquid to said steam-stripping zone, thereby avoiding loss of said unavoidably entrained liquid, and removing dehydrated liquid from said dehydration zone.

7. A method according to claim 6 wherein the substantially non-water miscible liquid is a distillate hydrocarbon.

8. A method of recovering a substantially dehydrated light cycle oil which comprises in combination the steps as follow: fractionating a fluid catalytic cracking reactor effluent in a fractionation zone employing a sponge oil, in said fractionation zone separating a light cycle oil from lighter hydrocarbons, gasolines, heavy cycle oil and heavier oil containing catalyst slurry resulting from entrainment of the fluid catalyst in the effluent from said fluid catalytic cracking reactor, passing the light cycle oil thus obtained to a steam-stripping zone, in said steam-stripping zone subjecting said light cycle oil to an elevated temperature steam stripping to remove occluded or dissolved vapors and any gasoline therefrom, then passing said stripped light cycle oil to a dehydration zone as sole material fed to said dehydration zone, in said dehydration zone flashing said oil at a reduced pressure to remove water therefrom, maintaining said dehydration zone at a reduced pressure employing steam in a reduced pressure-creating zone as a motive fluid therefor, recovering steam from said reduced pressure-creating zone together with unavoidably entrained light cycle oil and using said steam as stripping steam in said stripping zone, and recovering a dehydrated light cycle oil product from said dehydration zone.

9. A method of removing under reduced pressure from a first liquid a small residual proportion of another liquid dissolved therein which comprises in a stripping zone removing a substantial proportion of said another liquid employing a stripping medium, passing stripped first liquid, as the only stream of material fed thereinto, into a zone of reduced pressure, in said last zone flashing said residual proportion of said another liquid from said first liquid, removing from said last zone only two streams, an overhead vapor stream and a flashed first liquid stream, providing a reduced pressure producing zone in open communication with said zone of reduced pressure, removing said overhead vapor stream through said reduced pressure producing zone, employing as an activating medium for said zone said stripping medium and passing said stripping medium and overhead vapors into said stripping zone.

10. A method for substantially completely dehydrating an oil which comprises passing said oil to a steam stripping zone, in said zone stripping said oil of any light vapors and a substantial proportion of water present together with said oil in said zone, removing stripped oil from said zone, passing stripped oil, as the sole material fed thereinto, into a reduced pressure flashing zone, removing from said flashing zone only two streams, an overhead vapor stream and a flashed oil stream, providing a suction producing zone in open communication with the vapor space in said flashing zone, removing said overhead vapors through said suction producing zone, employing steam as an activating medium for said suction producing zone and passing steam from said last zone, together with overhead vapors removed from said flashing zone, to said stripping zone.

References Cited in the file of this patent

UNITED STATES PATENTS

| | | |
|---|---|---|
| 1,952,225 | Wallis et al. | Mar. 27, 1934 |
| 1,997,675 | Bahlke | Apr. 16, 1935 |
| 2,160,103 | Kraft et al. | May 30, 1939 |
| 2,594,352 | Schmalenbach | Apr. 29, 1952 |
| 2,774,723 | Moyer | Dec. 18, 1956 |
| 2,805,981 | Cavin et al. | Sept. 10, 1957 |